United States Patent Office 2,900,389
Patented Aug. 18, 1959

2,900,389

9-AZA-BICYCLO-[4,2,1]-NONA-2,4-DIENES

Gerhard Ottmann, Columbus, Ohio, assignor to Olin Mathieson Chemical Corporation, New York, N.Y., a corporation of Virginia No Drawing. Application March 20, 1957
Serial No. 647,186

12 Claims. (Cl. 260—313)

This invention relates to, and has for its object, the provision of (A) bicyclic double-unsaturated amines of the general formula

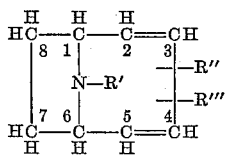

wherein each of R″ and R‴ is selected from the group consisting of hydrogen, lower alkyl, and monocyclic hydrocarbon aryl, and R′ is selected from the group consisting of hydrogen, alkyl, aminoalkyl, hydroxyalkyl, alkoxyalkyl, aralkyl and cycloalkyl; (B) acid-addition salts thereof; and (C) methods for their preparation.

These novel compounds, of which the preferred compounds are those wherein each of R″ and R‴ is hydrogen, and R′ is a lower alkyl, i.e., 9-(lower alkyl)-9-aza-bicyclo-[4,2,1]-nona-2,4-diene, especially 9-methyl-9-aza-bicyclo-[4,2,1]-nona-2,4-diene hydrochloride, have exceptional utility as cardiac stimulants and thus, may be administered by injection (e.g. intravenously and intramuscularly) in a manner similar to aminophylline for the treatment of cardiac conditions such as paroxysmal cardiac dyspnea.

The compounds of this invention may be prepared by a method which essentially comprises reacting a cyclo-octatetraene of the general formula

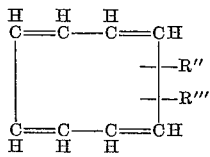

wherein R″ and R‴ are as hereinbefore defined, with an amine, H₂N-R′, wherein R′ is as hereinbefore defined. Suitable cyclo-octatetraenes include, inter alia: cyclo-octatetraene; lower alkyl cyclo-octatetraenes (e.g. methyl-cyclo-octatetraene, ethyl-cyclo-octatetraene, n-propyl-cyclo-octatetraene and n-butyl-cyclo-octatetraene); di(lower alkyl)cyclo-octatetraenes (e.g. 1,2-dimethyl-cyclo-octatetraene); monocyclic aryl cyclo-octatetraenes (e.g. phenyl-cyclo-octatetraene); and lower alkenyl cyclo-octatetraenes (e.g. vinyl cyclo-octatetraene). As the amine reactant there may be employed, in addition to ammonia, inter alia: alkylamines (e.g. methylamine, ethylamine, n-propylamine, isopropylamine, n-butylamine, tertiary butylamine, n-hexylamine, and n-dodecylamine); aralkylamines (e.g. benzylamine); cycloalkylamines (e.g. cyclohexylamine); hydroxyalkylamines (e.g. ethanolamine, 2-amino-propanol, 3-amino-propanol); alkoxy alkyl amines (e.g. 2-ethoxy-ethylamine); di-hydroxy alkyl-amines e.g. 3-amino-propanediol-1,2); di-alkoxy alkyl amines (e.g. 2,3-diethoxy-ethylamine); alkylene diamines (e.g. ethylene diamine); and substituted alkylene di-amines (e.g. N,N-diethyl-ethylene diamine).

The addition reaction between the cyclo-octatetraene and the amine usually requires relatively high temperatures; therefore, the reaction is preferably carried out under pressure in a closed vessel. This procedure has the further advantage of avoiding oxidative attack by air on the generally sensitive cyclo-octatetraenes. The preferred temperature range lies between 150 and 250° C.; and the necessary reaction time varies between 12 and 36 hours.

Ammonia and the primary amines may be used undiluted. In most cases, however, it is preferable to work in the presence of a diluent or solvent. Suitable solvents include: water; the lower aliphatic alcohols, such as methanol, ethanol or isopropanol; and benzene. Alternatively, the water-soluble salts of the amines with mineral acids, for example, the hydrochlorides, may be used. In this case the salts are dissolved in the preferred solvent (water); the cyclo-octatetraene is then added; and finally the exact stoichiometrical amount of alkali hydroxide is supplied in order to liberate the base.

Examples of salts of the free base compounds of this invention with pharmacologically-acceptable acids include the mineral acid salts, such as the hydrohalides (e.g. hydrochloride, hydrobromide and hydroiodide), the sulfate and the phosphate; and the organic acid salts, such as the acetate, the citrate, tartrate, oxalate, ascorbate and succinate. Included by the term "acid-addition salts" within the purview of this invention are the mono-acid addition salts, and (in the case of the 9-aminoalkyl compounds) the di-acid addition salts. To form the acid-addition salts, the free base is treated with the desired acid. In the case of the 9-aminoalkyl compounds, the nature of the salt formed will depend on the ratio of acid to base. If one equivalent of acid is present per mole of base, a mono-acid-addition salt is the major product formed; and if two equivalents of acid are present per mole of base, a di-acid-addition salt is the major product.

The following examples are illustrative, but by no means limitative, of the invention:

EXAMPLE I (a) *9-methyl-9-aza-bicyclo-[4,2,1]-nona-2,4-diene*

A solution of 300 grams of methylamine in 500 grams of methanol is added to 50 grams of cyclo-octatetraene and the mixture heated in a stainless steel autoclave for 15 hours at 175° C. and then for 14 hours at 200° C. The contents of the autoclave are then subjected to a fractional distillation through a small column, thus removing excess methylamine, methanol and most of the unreacted cyclo-octatetraene. The residue is then dissolved in ether and the basic products extracted by 4 N-aqueous hydrochloric acid. By oversaturating the acid layer with potassium carbonate the bases are separated and dissolved in ether. The ethereal layer is distilled on a steam bath to remove the solvent and the residue fractionated in vacuo. The resulting 9-methyl-9-aza-bicyclo-[4,2,1]-nona-2,4-diene boils at about 63–64° C. (5.5 millimeters) $n_D^{27°}$ 1.5058. It is a colorless oil with a characteristic amine odor, which instantly reduces potassium permanganate and gold chloride.

(b) *9-methyl-9-aza-bicyclo-[4,2,1]-nona-2,4-diene hydrochloride*

The hydrochloride of the base is prepared by passing dry hydrogen chloride into an ethereal solution of the amine. It is recrystallized from absolute ethanol in white rhombs, melting at about 174–174.5° C.

EXAMPLE II

9-methyl-9-aza-bicyclo-[4,2,1]-nona-2,4-diene

A mixture of 77.5 grams of methylamine, 750 milliliters of benzene and 50 grams of cyclo-octatetraene is heated for 24 hours to 175° C. Following the procedure described in Example I (a), a yield of about 7.4 grams of pure 9-methyl-9-aza-bicyclo-[4,2,1]-nona-2,4-diene is obtained.

EXAMPLE III

9-aza-bicyclo-[4,2,1]-nona-2,4-diene

An aqueous solution of ammonia saturated at 0° C. (705 grams) is heated with 52 grams of cyclo-octatetraene for 24 hours to 225° C. The same procedure as described in Example I(a) is used for separating the formed amine. The 9-aza-bicyclo-[4,2,1]-nona-2,4-diene is obtained as a colorless oil, boiling at about 35–36° C. (0.5 millimeter). $n_D^{25°}$ 1.5336.

EXAMPLE IV

(a)  9-propyl-9-aza-bicyclo-[4,2,1]-nona-2,4-diene

A mixture of 52 grams of cyclo-octatetraene and 500 grams of n-propylamine diluted with 500 milliliters of methanol are reacted at 175° C. for 24 hours. Following the same procedure described in Example I(a), 9.2 grams of 9-propyl-9-aza-bicyclo-[4,2,1]-nona-2,4-diene are obtained as a colorless viscous liquid, sensitive to air. Boiling point about 41–43° C. at (0.15 millimeters). $n_D^{31.5°}$ 1.4912.

($a^1$) The same 9-propyl-9-aza-bicyclo-[4,2,1]-nona-2,4-diene is obtained when the above described run is carried out using water instead of methanol.

(b)  9-propyl-9-aza-bicyclo-[4,2,1]-nona-2,4-diene hydrochloride

The hydrochloride of the base is prepared by passing dry hydrogen chloride into an ethereal solution of the amine. It can be recrystallized from absolute ethanol to yield a product melting at about 167.5° C.

EXAMPLE V

9-n-butyl-9-aza-bicyclo-[4,2,1]-nona-2,4-diene

Cyclo-octatetraene (50 grams) is heated with 366 grams of n-butylamine in 550 grams of water for 24 hours to 195° C. The desired amine, 9-n-butyl-9-aza-bicyclo-[4,2,1]-nona-2,4-diene is obtained as a colorless liquid, boiling at about 48–50° C. (0.15 millimeter). $n_D^{27°}$ 1.4950. Yield: about 10.1 grams.

EXAMPLE VI

9-n-hexyl-9-aza-bicyclo-[4,2,1]-nona-2,4-diene

Cyclo-octatetraene (52 grams) and 500 grams of n-hexylamine are heated in an autoclave for 24 hours to 195° C. By fractional vacuum distillation the 9-n-hexyl-9-aza-bicyclo-[4,2,1]-nona-2,4-diene is obtained as a slightly yellowish viscous oil, boiling at about 84.5–85.5° C. (0.15 millimeter). $n_D^{27°}$ 1.4890.

EXAMPLE VII

9-cyclohexyl-9-aza-bicyclo-[4,2,1]-nona-2,4-diene

A mixture of 30 grams of cyclo-octatetraene and 300 grams of cyclo-hexylamine is heated to 150° C. for 14 hours and then to 175° C. for another 10 hours. By following the procedure of Example I(a), 9-cyclo-hexyl-9-aza-bicyclo-[4,2,1]-nona-2,4-diene is obtained as a colorless liquid, boiling at about 102° C. (0.45 millimeter). $n_D^{23°}$ 1.5340.

EXAMPLE VIII

9-benzyl-9-aza-bicyclo-[4,2,1]-nona-2,4-diene

Cyclo-octatetraene and benzylamine are reacted under the same conditions as described in Example I(a) resulting in the formation of 9-benzyl-9-aza-bicyclo-[4,2,1]-nona-2,4-diene as a yellowish viscous oil, boiling at about 113–115° C. (0.27 millimeter). $n_D^{24°}$ 1.5702.

EXAMPLE IX

9-(β-hydroxyethyl)-9-aza-bicyclo-[4,2,1]-nona-2,4-diene

A solution of 457 grams of ethanolamine in 457 grams of water and 52 grams of cyclo-octatetraene are heated in an autoclave for 24 hours to 170–180° C. The reaction mixture coming out of the autoclave is distilled in vacuo to remove water and excess ethanolamine. The distillate is once extracted with ether to recover a part of the desired product which is entrained with the water vapors. This ethereal extract is combined with the residue in the distillation flask, and the procedure of Example I(a) is followed. The 9-(β-hydroxyethyl)-9-aza-bicyclo-[4,2,1]-nona-2,4-diene obtained is a colorless viscous liquid, boiling at about 101–106° C. (0.42 millimeter). $n_D^{28°}$ 1.5325.

EXAMPLE X

(a)  9-(β-aminoethyl)-9-aza-bicyclo-[4,2,1]-nona-2,4-diene

A solution of 450 grams of ethylenediamine in 450 grams of water is heated with 52 grams of cyclo-octatetraene for 24 hours to 185° C. By following the procedure described in Example I(a), 11.7 grams of 9-(β-aminoethyl)-9-aza-bicyclo-[4,2,1]-nona-2,4-diene is obtained as a colorless viscous liquid, easily absorbing carbon dioxide from the air and sensitive against oxygen, but definitely stable under nitrogen or in a vacuum. The compound boils at about 66–67° C. (0.5 millimeter). $n_D^{27°}$ 1.5297.

(b)  9-(β-aminoethyl)-9-aza-bicyclo-[4,221]-nona-2,4-diene dihydrochloride

A dihydrochloride is obtained by oversaturating the ethereal solution with gaseous hydrogen chloride. Melting point: 242° C. with decomposition.

The invention may be variously otherwise embodied within the scope of the appended claims.

What is claimed is:

1. A compound selected from the group consisting of free bases of the general formula:

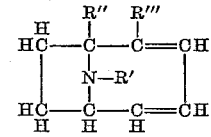

wherein each of R″ and R‴ is selected from the group consisting of hydrogen, lower alkyl and phenyl and R′ is selected from the group consisting of hydrogen, lower alkyl, amino lower alkyl, hydroxy lower alkyl, lower alkoxy lower alkyl, phenyl lower alkyl and cyclohexyl; and pharmacologically acceptable acid addition salts thereof.

2. 9-lower alkyl-9-aza-bicyclo-[4,2,1]-nona-2,4-diene.

3. A pharmacologically acceptable acid-addition salt of 9-lower alkyl-9-aza-bicyclo-[4,2,1]-nona-2,4-diene.

4. 9-phenyl lower alkyl 9-aza-bicyclo-[4,2,1]-nona-2,4-diene.

5. 9-cyclohexyl-9-aza-bicyclo-[4,2,1]-nona-2,4-diene.

6. 9-aza-bicyclo-[4,2,1]-nona-2,4-diene.

7. 9-amino lower alkyl 9-aza-bicyclo-[4,2,1]-nona-2,4-diene.

8. A pharmacologically acceptable acid-addition salt of

9 - amino lower alkyl)-9-aza-bicyclo-[4,2,1]-nona-2,4-diene.

9. 9-hydroxy lower alkyl 9-aza-bicyclo-[4,2,1]-nona-2,4-diene.

10. 9-methyl-9-aza-bicyclo-[4,2,1]-nona-2,4-diene.

11. 9-benzyl-9-aza-bicyclo-[4,2,1]-nona-2,4-diene.

12. 9 - (β - aminoethyl) - 9 - aza - bicyclo - [4,2,1]-nona-2,4-diene.

References Cited in the file of this patent

UNITED STATES PATENTS 2,783,235    Grundmann et al. _____ Feb. 26, 1957

OTHER REFERENCES

Jour. Am. Chem. Soc., vol. 70, pp. 1433–1437 (1948).
Jour. Am. Chem. Soc., vol. 72, pp. 1123–1132 (1950).